United States Patent [19]
Hockaday

[11] Patent Number: 5,631,099
[45] Date of Patent: May 20, 1997

[54] SURFACE REPLICA FUEL CELL

[76] Inventor: Robert G. Hockaday, 3025 Arizona Ave., Los Alamos, N.M. 87544

[21] Appl. No.: 531,378

[22] Filed: Sep. 21, 1995

[51] Int. Cl.⁶ .................................................. H01M 8/10
[52] U.S. Cl. ........................... 429/30; 429/42; 427/105; 427/115; 427/238; 502/101
[58] Field of Search .................... 429/30, 35, 42; 427/105, 115, 230, 238, 307; 501/101

[56] References Cited

U.S. PATENT DOCUMENTS

| | | | |
|---|---|---|---|
| 4,138,510 | 2/1979 | Koziol et al. | 427/115 X |
| 4,243,508 | 1/1981 | Dankese | 204/301 |
| 4,252,868 | 2/1981 | Bohm et al. | 429/41 |
| 4,421,579 | 12/1983 | Covitch et al. | 156/60 |
| 4,623,415 | 11/1986 | Kahara et al. | 429/41 X |
| 4,661,423 | 4/1987 | Ueno et al. | 429/41 |
| 4,666,579 | 5/1987 | Beaver et al. | 204/253 |
| 4,673,624 | 6/1987 | Hockaday | 429/41 |
| 4,769,297 | 9/1988 | Reiser et al. | 429/17 |
| 4,804,449 | 2/1989 | Sweeney | 204/256 |
| 4,818,637 | 4/1989 | Molter et al. | 429/15 |
| 4,824,741 | 4/1989 | Kunz | 429/26 |
| 4,826,554 | 5/1989 | McIntyre et al. | 156/280 |
| 4,865,925 | 9/1989 | Ludwig et al. | 429/12 |
| 4,931,168 | 6/1990 | Watanabe et al. | 429/42 X |
| 5,084,144 | 1/1992 | Reddy et al. | 205/104 |
| 5,108,849 | 4/1992 | Watkins et al. | 429/30 |
| 5,173,166 | 12/1992 | Tomantschger et al. | 204/412 |
| 5,187,025 | 2/1993 | Kelland et al. | 429/33 |
| 5,234,777 | 8/1993 | Wilson | 429/33 |
| 5,240,786 | 8/1993 | Ong et al. | 427/115 X |
| 5,242,764 | 9/1993 | Dhar | 429/30 |
| 5,252,410 | 10/1993 | Wilkinson et al. | 429/33 |
| 5,262,250 | 11/1993 | Watanabe | 429/33 |
| 5,264,299 | 11/1993 | Krasij et al. | 429/30 |
| 5,266,421 | 11/1993 | Townsend et al. | 429/192 |
| 5,290,323 | 3/1994 | Okuyama et al. | 29/623.5 |
| 5,316,871 | 5/1994 | Swathirajan et al. | 429/33 |

FOREIGN PATENT DOCUMENTS

| | | |
|---|---|---|
| 239169 | 9/1987 | European Pat. Off. . |
| 60-33284 | 2/1985 | Japan . |
| 874283 | 8/1961 | United Kingdom . |
| 2139110 | 11/1984 | United Kingdom . |
| 2268619 | 1/1994 | United Kingdom . |

OTHER PUBLICATIONS

Abbott et al., "Manipulation of the Wettability of Surfaces . . . ", Science, vol. 257, pp. 1380–1382 (Sep. 4, 1992).

J.S. Batzold, "Thin Film Cell Electrodes", From Electrocatalysts To Fuel Cells, Ed. by G. Sanstede, pp. 224–229, Jun. 8, 1972.

B.D. Cahan, "Tge Mechanism of Electrodic Reactions of Porous Surfaces", Ph.D. Dissertation, 1968.

(List continued on next page.)

Primary Examiner—Stephen Kalafut
Attorney, Agent, or Firm—James Creighton Wray

[57] ABSTRACT

A compact, surface replica fuel cell has a fiber reinforced, porous central membrane and two porous outer membranes. Thin film catalyst and metal electrode materials are deposited on both sides of the central membrane. The electrodes are deposited using a variety of techniques, including ion or light bombardment, etching and vacuum thin film deposition. For compound fuels, two catalysts are deposited. The first catalyst forms the interior surface replica electrode. The second catalyst is positioned on the interior of the pores to scavenge hydrogen before the hydrogen is diffused out of the electrode and electrolyte. A hydrophobic film is deposited over the electrode films to control electrolyte positioning and to strengthen the electrodes. Catalyst surface active area is maximized by separating the catalyst film from the porous, non-electrolyte substrate and filling the voids between the substrate and the catalyst film with an electrolyte. The fuel cell operates by supplying fuel gas to one electrode and an oxidizer gas to the other electrode. The cell may also function as an electrolysis cell for generating reactant gases from the electrolyte. During operation of the present invention, water is captured on cooler outer gas manifold surfaces of the cell and recirculated through electrode vias. Water content is regulated by a coating on the outer porous membranes.

41 Claims, 5 Drawing Sheets

OTHER PUBLICATIONS

Robert G. Hockaday, "Develop & Modeling of the Homoporous . . . ", Masters Thesis, New Mexico State University, Dec., 1984.

Leddy et al., "Composite Ion Exchange . . . ", Abstract of an oral presentation, Journal of Electroch. Sty, vol. 135, No. 3, p. 139C, Mar. 1988.

Narayanan et al., "Electrochemical Characteristics of Carbon–Supported . . .", 1992 Fuel Cell Seminar, Tucson, AZ, Nov. 29–Dec. 2, 1992, pp. 233–236.

Naylor et al., "A Novel Anode System . . . ", 1992 Fuel Cell Seminar, Tucson, AZ, Nov. 29–Dec. 2, 192, pp. 575–578.

Sarangapani et al., "Advanced Corrosion–Resistant Coatings . . . ", 1992 Fuel Cell Seminar, Tucson, AZ, pp. 167–170.

Srinivasan et al., "Fundamental Equations of Electrochemical Kinetics . . . ", J. Chem. Phys., vol; 46, pp. 3108–3122, Apr. 15, 1967.

Wolf Vielstich, "Fuel Cells: Modern Processes for the Electrochemical . . . ", Verlag Chemie, GmbH, 1967 (translated by D.J.G. Ives 1970), pp. 68–76, 184–189.

SURFACE REPLICA FUEL CELL

BACKGROUND OF THE INVENTION

Fuel cells transform chemical energy to electrical energy by reacting gas in the presence of an electrolyte, electrodes and a catalyst. A catalyst and the electrodes may be platinum or an expensive material. Consequently it is desirable to use as little catalyst and electrode material as possible. Fuel cells are often used to generate electricity in remote locations. Consequently it is highly desirable to construct a fuel cell as compact and as lightweight as possible. To produce a fuel cell that is economically viable as a mass produced product, the process of forming the fuel cells needs to be one that optimizes the cost of materials, the cost of production and the operational performance.

A 1961 British Patent 874,283 describes a micro-porous fuel cell electrode based on un-plasticized polyvinyl chloride. The typical polyvinyl chloride researched was 0.76 mm thick and had very uniform 5 micron pores. Surfaces were metallized by vacuum evaporations of silver or gold. The catalyst layer was applied by electro-deposition or incorporated in a binder. Cells up to 5 kW air hydrogen were formed but were limited to 65° C. by the use of polyvinyl chloride. Polyethylene porous substrates were considered to be usable up to 80° C.

The concept of supporting fragile electrodes with a fiber matrix has been used. Siemens Company used a porous layer of powder embedded into an asbestos membrane. The asbestos membrane provided the mechanical support for the powder electrode.

An etched porous Vycor glass substrate has been sputter coated with tantalum and platinum films to form electrodes. The electrodes formed a fuel cell with a high catalyst utilization. Further research concluded that glass Vycor substrates were impractical and that porous metal electrodes offered no advantage in sputter-depositing the catalysts within the context of a space application fuel cell.

The present inventor used an etched-nuclear-particle-track membrane (such as a Nuclepore filter made by the Nuclepore Corporation, Pleasanton, Calif.) as the substrate, so that the electrode would have the toughness of a plastic film and the exact pore geometry needed for micro-engineering. By using a simple pore model the output of the cells could generally be predicted. The thinnest cell tested was nominally 10 microns thick. It appears that the practical limitations on the cell's thickness are the membrane's strength, fuel diffusion resistance, and cooling capacity. A minimum cell thickness minimizes the cell resistance losses and maximizes the power per unit mass ratio. There are several difficulties with the coating of the nuclear-particle-track-dielectric film with vacuum deposited catalysts and electrodes. A first is that the vacuum deposited films often have poor sticking coefficients to the dielectric films and separate from the film during operation. A second is that the dielectric films are often not capable of operating at the higher temperatures or electrolyte environments. A third is that to form series cell stacks, the metal films need to be thickened with conductive metal films to avoid mechanical damage from the cell contact or high film resistivity. Most of the metal films that are non-corroding conductors and can be deposited at low enough temperatures for the plastic substrates are of comparable expense to the catalyst films, such as gold. The cost of the bulk metal conductors becomes a limiting factor.

Electrolytes that could be advantageously incorporated into the electrodes of the present invention are the perfluorinated ion exchange polymer electrolytes such as Nafion from E. I. DuPont de Nemours. Nafion has been adsorbed into Nuclepore membranes and expanded PTFE matrixes. Perfluorinated ion exchange polymer electrolytes or Proton Exchange Membranes (PEM) are commercially available with expanded PTFE reinforcing from E. I DuPont. The effective conductivity through the Nafion is increased by as much as 20 fold over the original Nafion membranes by being in the Nuclepore membranes. Thus, by structuring the perfluorinated ion exchange polymer electrolyte, the conductivity is enhanced, reducing the amount of polymer electrolyte needed and the gas diffusion simultaneously. The new invention describes this as a collimated electrolyte. Lateral electrolyte ionic conduction, perpendicular to the pore direction, is blocked by the collimating dielectric membrane. The technique of forming fuel cell electrodes on a matrix impregnated with a polymer electrolyte is described in U.S. Pat. No. 4,666,579. The methods of dissolving the Nafion in alcohol are described in U.S Pat. No. 5,084,144.

The current state of the art for PEM fuel cells has been to deposit "platinum inks" onto perfluorinated ion exchange polymer electrolytes as disclosed in U.S. Pat. No. 5,084,144. It has been realized by researchers in the field that the platinum utilizations are now to the point where the remaining components costs dominate the cost of the fuel cells, for example the cost of perfluorinated ion exchange polymers such as Nafion membranes. Membranes as thin as 20 microns have been manufactured and have achieved current densities of 3 amps per square centimeter, driving costs down by getting more power per unit area. Thinner electrolyte films have not been used because of the films being fragile and pinhole defects causing shunting of the electrodes. The apparent fundamental assumption in the general field is that the cost per unit area is relatively fixed due to the frame and gas separator costs. The next considerations are functionality and manufacturability.

Humidity control is an ongoing engineering concern of many fuel cell designs. The fuel cells that do not circulate the electrolytes tend to dehydrate their electrolytes, because they operate hotter than their surroundings. That can lead to the cells operating far from the optimum conditions in the fuel cells. The typical method of re-hydrating the fuel cells is to capture water in the exhaust stream in a colder condenser, and then to humidify the fuel supply gas above the water vapor pressure of the fuel cells with a higher temperature vaporizer. That adds weight and complexity to the operation of the fuel cells. One solution has been to flow water back through a central hole as disclosed in U.S. Pat. No. 5,242,764. That electrolyte recirculation eliminates the need for high differential pressures to control electrolyte water balance, thereby eliminating the need for the electrodes and separator backing to withstand large pressure differences. That permits fuel cells to be far lighter. Part of the electrolyte is mobile. Problems associated with a mobile electrolyte include the need for additional space in the electrolyte above what is needed for fuel cell operation for lateral water diffusion. The added size of that space depends on the distance and diffusion resistance to the central flow through hole. That space could significantly increase the cell's resistance. U.S. Pat. No. 5,242,764 also requires more expensive electrolyte to accommodate the lateral movement of water through it and adds costs and weight to the cell. By having a mobile electrolyte, there could be leakage, depletion and corrosion problems.

Current low temperature fuel cell stacks (roughly below 200° C.) use bipolar stacking of the electrode and gas separation partitions. The partitions need to be electrically conductive and gas impermeable. They often need to survive in the same electrolyte environment as the fuel cell electrodes. The separators usually need to withstand the gas pressure differences between the fuel and the oxidizer gases. Thus the separators are typically mechanically robust. That leads to the need to use bulk metal separators with at least non-corrosive metal exteriors such as graphite, doped diamond, platinum or gold coatings. By making the electrical contact onto those separators in the moist corrosive environment (fuel and oxidizer on either side and contact with electrolyte and product water) there can be corrosion and fuel cell lifetime reductions. By having a large fraction of the fuel cell stack made of metal, the fuel cell stack has a higher liability of catastrophic electrical and explosion failure when a shunt occurs. The shear bulk mass of the gas separators reduces the specific power per unit mass of the fuel cell.

Recently new catalysts for direct methanol electrocatalysts have emerged for acidic electrolytes. Those catalysts have 10 to 100 times more activity than pure platinum with methanol and formaldehyde fuels. The conventional method at this time is to use the typical powder catalyst electrodes with no geometric differentiation of the location of the catalysts in the electrodes. The direct methanol reformer fuel cells have problems of creating produced carbon dioxide in the fuel supply that needs to be exhausted. The exhaust fuel stream is depleted of methanol and hydrogen by the fuel cell and is concentrated with carbon dioxide. The exhaust gas then usually is combusted to remove the residual hydrogen and is released to the atmosphere. A problem is that the release of hydrogen and methanol is an energy inefficiency of that fuel cell scheme, and the greater the carbon dioxide concentration of the fuel stream the lower the performance of the fuel cell. Ideally the exhaust from the fuel cell would have no unutilized methanol or hydrogen and be low in carbon dioxide. There would be no need for exhaust stream combustion.

Cell performances of 1 amp/cm$^2$ with platinum catalysts on nickel substrates have also been achieved with alkaline electrolytes. Those experiments use platinum catalysts on porous nickel support structures. A current problem facing the alkaline cells is that the carbon dioxide generated from the fuel cell forms a carbonate precipitate in the electrolyte if the concentration of carbon dioxide in the electrolyte is sufficiently high.

SUMMARY OF THE INVENTION

The present invention provides compact fuel cells having economic use of materials and operational optimization.

A fuel cell is constructed of three porous membranes. The first, central membrane has electrodes formed on either side. The outer two membranes are water regulating and circulating membranes. The electrodes on the central membrane are formed by depositing thin film catalyst and metal electrode materials onto both sides of the surface of the fiber-reinforced porous membrane. In the event of an inadvertent short occurring, the cells also have a built-in shunt opening property due to using thin film electrodes and a high insulator-to-metal ratio throughout the cell construction.

The porosity of the membranes and the deposits can be designed for high catalyst surface area, forming vias for series cell connections and electrode breaks. Hydrophobic films are deposited over the electrode films to control the position of the electrolyte in the pores and to strengthen the electrodes. Metal conductors that are more cost effective can be deposited to provide for electrode conductivity and strength. The catalyst active surface area is maximized by separating the catalyst film from the porous substrate and then filling the intervening volume with electrolyte. For compound fuels, such as methanol, two catalysts are deposited. The first catalyst forms the interior surface replica electrode (methanol active catalyst), and the second catalyst is deposited on the interior of the pores to scavenge hydrogen before it diffuses out of the electrode and electrolyte (hydrogen active, methanol inactive catalyst).

The fuel cell is operated by supplying fuel gas to one of the electrodes and oxidizer gas to the other, or as an electrolysis cell generating reactant gases from the electrolyte. During operation water can be captured on the cooler outer gas manifold surfaces and recirculated by flowing through the electrode vias. To moderate the water content of the fuel cell the porous outer membranes can be coated with materials that retain water when the cell is dehydrating and shed water when the cell is too wet. The resulting fuel cell has a high specific power per unit mass and makes efficient use of the catalyst and electrode materials.

Principal advantages of the surface replica thin film techniques are the control of exact geometry of uniform pores formed by etched-nuclear-particle tracks, coupled with the vacuum thin film deposition, which permits the liquid/gas interface, electrical vias and the catalyst position in the pores to be controlled to a nanometer level. By using the underside of the film replica as a catalytically active surface, all of the first deposited layer can be put in contact with the electrolyte without the need to remove any outer surface catalyst as described in U.S. Pat. No. 4,673,624 with inner pore deposits. The present invention results in maximization of the utilization of catalyst material with a fast manufacturing process. With the structure that makes supporting a thin film electrode over an electrolyte practical comes the capability that the molecular semi-permeability of the thin electrode material, such as the selective permeability of palladium to hydrogen, can be used to deliver reactants through the electrodes and to filter the reactant streams of various species, such as carbon monoxide or methanol.

The precise positioning of the present invention allows for the efficient use of catalysts and conductors, minimizing the inactive mass found in conventional fuel cells. The new fuel cell electrodes, cell size, electrolyte thickness and catalysts can be optimized and can be produced by lithographic techniques. The improvements of the present fuel cell over powder-fiber-technology-type fuel cells include a tougher fuel cell structure, greater ease in mass production and an increase in the power per cell stack mass.

The exact electrolyte and catalyst positioning of the present invention also results in a more stable power output. The electrolyte recirculation capability and possible exclusive use of noble electrodes allow the cell to operate as a stable electrolysis cell.

The present fuel cells are produced as a non-bipolar series of cells on a single thin flexible layer. That cell structure affords unprecedented packaging opportunities as compared to the rigid, bolted, thick-plate stack structure of conventional fuel cells. Those packaging advantages include:

a thin, mechanically pliant cell structure that bends to conform with curved surfaces a structure that can be formed in unusual free-form shapes a structure that can be made very small or very large by varying the area. Series cells nominally 10 microns thick have been constructed, exclusive of packaging.

Three new safety features are incorporated in the new fuel cell. First, the hazards of sudden decompression for pressurized fuel cells is reduced by restricting fluid flows through small diameter pores and tubes. The reactant storage tanks and gas manifolds can be filled with capillary tubes and pores. In the event of a sudden breach the gas flow will be restricted by viscous drag in the small diameter flow channels. The second safety feature for the water recirculation for the solid polymer electrolyte fuel cells is that high differential pressure cell operation is no longer needed to counteract the ionic drag of water across the electrolytes. That can eliminate the need to have pressurized fuel cells and hence rupture hazards. A third safety feature of the present invention is that the high insulator to metal content ratio of the new fuel cell prevents catastrophic internal electrical shorting, which can be a significant explosion hazard if it leads to a rupture and sudden mixing of the reactants or simple electrical discharge heating.

In the new invention the gas separator can be eliminated and the utilization of the expensive solid polymer electrolyte can be dramatically increased. The frames can be far less substantial and less expensive. That destroys the cost per unit area assumption and diverts the major costs away from materials to manufacturing costs.

In the new invention the electrolyte is immobilized. The new fuel cell furthers the concept of leaking water back through the cell through holes with a far more compact scheme of local water control and simplifies the overall system operation. In the present fuel cell the electrolyte can be mobile or immobilized and can be as thin as needed to minimize the electrolyte resistance. In the new invention, by filling the electrolyte into a collimated porous dielectric material, such as the etched nuclear particle track membranes (NUCLEPORE membrane filters), the lateral electrolyte ionic conduction, perpendicular to the pore direction, is blocked. If the electrolyte is removed from the outer surface of the membrane, the electrolyte gives the electrolyte membrane a single directional conductivity property that is used to form effective electrical cell separations with uniformly porous substrates. Without this collimated electrolyte property in non-bipolar series cells with homogenous electrolytes on single membranes, there would be shunt currents to adjacent cells. Another alternative for forming cell separations in the present invention is forming nonporous dielectric electrical separations in the electrolyte along with the electrode separations. Both of these methods of cell separation can be used to create efficient non-bipolar series cells on single membranes. The short distances to the flow through and electrical vias in the new fuel cell decreases the electrical resistance, water recirculation resistance, and also enhances internal electrolyte water circulation. By using common electrical and flow through vias, the cell is simplified and resistance to water flow is reduced and even mildly accelerated by the ohmic potentials along the electrodes.

In the present fuel cell the gas cell separator is eliminated, due to non-bipolar stacking. The electrodes are thin. The metal-to-insulation content is low, resulting in an electrical-shunt-resistant and lightweight system.

The new fuel cell has a new electrode that solves the exhaust and inefficiency problems by reforming the compound fuels directly in the electrodes and by using the hydrogen before it diffuses out of the electrode in a simple and efficient manner.

Carbon dioxide and carbon monoxide poisoning can be solved in the new electrodes by making the electrodes semi-permeable to gas diffusion to filter the fuel, while efficiently utilizing the hydrogen before it diffuses across the membrane. The liquid electrolyte also can be circulated on the miniature scale of these new electrodes, and the lower temperatures of the outer water-capture water-circulation surfaces will tend to let the precipitates form on the outside of the cell rather than on the inside of the electrolyte. It is possible that if the electrolyte is circulated frequently and if there is adequate electrolyte exchange with the atmosphere the carbon dioxide can be diffused out of the electrolyte. Cyclic thermal cycling along with thermal gradients also could remove deposits. Purging the cells or periodic cell voltage reversals can be used to remove the catalyst poisons such as carbon monoxide.

The present invention brings to the state-of-the-art new methods of forming electrodes, non-bipolar series stack electrodes, fault elimination as an integral part of the structure, local water recovery and water control, multiple catalyst/geometric fuel stoichiometric control, semi-permeable membrane gas separation, equilibrium pressure operation across the fuel cell and exact cell formation methods.

New and unique features of the present invention include:
replication of the porous surfaces for fuel cells
replication of a porous surface and purposely separating from the substrate surface to form fuel cell electrodes
nuclear particle or photon bombardment to structure the substrate surfaces for the replica electrodes
controlling the condensation/microstructure of the thin film deposition coatings to obtain desired properties
using a fiber matrix to fold the fuel cell assembly together
using dielectric and plastic films to strengthen and to enhance the adhesion of the replica films to the fiber matrix
using vacuum deposited films to control the surface tension and position of the electrolyte
purposely replicating an egg-crate surface to give the replica electrodes flexibility
forming the fuel cell on a single membrane substrate
forming non-bipolar cells on a single membrane with through holes and separation gaps
forming non-bipolar cells with radiation damage
using a collimated electrolyte to block lateral ionic conduction between adjacent cells in non-bipolar series on a common membrane
using porous outer surfaces to retain and circulate electrolyte
using porous, outer surfaces having areas that are hydrophobic, hydrophilic or hygroscopic, with the pores of the surfaces being hydrophobic the keep the gas channels open and the outer surfaces being hygroscopic
having the water flow through pores and electrical vias as the same elements
using thin films of noble metals as the optimum bulk conductor
maintaining a high insulator-to-metal ratio throughout the cell to derive shunt disconnection properties
fusing behavior of small metal fingers of the electrodes
reversibility of the cell for electrolysis
geometrically separated multiple catalysts in the microstructure of the electrodes
using the thin film fuel cell electrodes preferential permeability as a molecular filter for reactants
using the preferentially permeability of the fuel cell to exhaust impurities and to contain reactants
sudden pressure change flow retardant porous materials used with fuel cells
partial removal of the plastic substrate helps the cell maintain structural integrity, block molecular diffusion and enhance electrolyte conductivity A fuel cell apparatus includes a first, central fiber-reinforced membrane having an oxygen side and a hydrogen side. Electrodes are positioned on the hydrogen side and the oxygen side of the membrane. Each electrode includes a first catalyst film layer deposited on the central membrane, a metal film layer deposited over the catalyst film layer, and a hydrophobic film layer positioned on the metal film layer. The catalyst film layer is separated from the central membrane by voids. Electrolyte is injected in the voids between the catalyst film layers and the central membrane. The fuel cell also includes a first water circulating and regulating membrane positioned above the hydrogen side electrode, a fuel channel flow manifold positioned above the first water circulating and regulating membrane and sealed to the hydrogen side electrode, and a fuel inlet connected to the fuel manifold for delivering fuel to a region between the fuel manifold and the first water circulating and regulating membrane. A second water circulating and regulating membrane is positioned below the oxygen side electrode. An oxygen gas manifold is positioned below the second water circulating and regulating membrane and is sealed to the oxygen side electrode. An oxidizer gas inlet is connected to the oxygen gas manifold for delivering oxidizer gas to a region between the oxygen gas manifold and the second water circulating and regulating membrane. The fuel cell further includes a first electrical contact connected to the hydrogen electrode, a second electrical contact connected to the oxygen electrode, and a sealing rim extending around and connected to outer edges of the cell.

The central membrane is preferably a fiber matrix impregnated with a plastic material and has small pores and penetration channels extending through the membrane. Overhang ledges are formed on the hydrogen and oxygen sides of the membrane. The fiber matrix is an insulating fiber matrix made from a material selected from the group consisting of porous paper, open cell foams, expanded PTFE and other network matrix material. The plastic material in the membrane is preferably a polycarbonate plastic or perfluorinated ion exchange polymer. Alternately, the central membrane can be a fiber matrix impregnated with a removable solid such as aluminum.

The central membrane has pores and penetration through channels extending through the membrane. The electrodes are thin film electrodes, and the catalyst film of each electrode substantially covers an entire exterior surface of the central membrane and partially covers inner surfaces of the pores and the penetration through channels. The central membrane further includes overhang ledges on the hydrogen and oxygen sides of the membrane and openings in the electrode and electrolyte under the overhang ledges. To keep the ledges free of electrolyte, ion milling and deposits of hydrophobic films such as polytetrafluoroethylene (PTFE) can be deposited into the ledge.

In one embodiment, instead of the overhang ledges, such as when the central membrane is a uniformly collimated porous dielectric membrane impregnated with a solid electrolyte such as perfluorinated ion exchange polymer, the cell breaks are surface cleared of electrolyte and electrodes to form the cell separations. Ion milling or laser ablation can be used to clear the surface of the electrolyte and metal deposits. Masking the deposition of catalysts and metal deposits can be used to keep the cell separations clear. PTFE film deposits in the cell separation zones can be used to keep these areas clear of water and electrolyte. The cell through contacts in this embodiment are made by penetrating electrode metal deposits through the electrodes or depositing metal around the edge of the membrane when it is practical with small fuel cells. Ion milling or laser drilling is used to clear or form the through contact holes.

The metal film layer of the electrode is made of a bulk metal material selected from the group consisting of gold, platinum, palladium, ruthenium, graphite, boron doped diamond, refractory metals and electrically conducting refractory metal compounds.

Each metal film layer is a bulk metal conductor film layer that covers inner surfaces of the penetration through channels and that makes electrical contact with the underlying catalyst film layer. The electrodes are permeable to fuel and oxidizer gas. In one embodiment, the metal film layer on the hydrogen side of the membrane is semipermeable and the metal film layer on the oxygen side of the membrane is permeable.

The hydrophobic film layers are preferably made of PTFE and have thicknesses of about 300 nanometers. Preferably, the hydrophobic film positioned on the hydrogen side of the central membrane is less hydrophobic than the hydrophobic film positioned on the oxygen side of the central membrane.

A hydrophilic surface coating may be applied to the hydrophilic film on the hydrogen side of the membrane for allowing electrolyte injection into the voids.

For compound fuel applications, a second catalyst film layer is positioned over the hydrogen side electrode.

The hydrogen side electrode is separated from the first water circulating and regulating membrane by a first gap and the oxygen side electrode is separated from the second water circulating and regulating membrane by a second gap. The first and second gaps are small, on the scale of about 10–50 microns.

The first water circulating and regulating membrane and the second water circulating and regulating membrane are reinforced with fibers.

A permeable membrane is positioned in the fuel manifold for passing carbon dioxide and other exhaust products and impurities.

The fuel manifold and the oxygen gas manifold are sealed by glue or by welding.

The first and second electrical contacts are connected to the respective electrode outside of the connection of the manifolds to the electrode. The first and second electrical contacts are connected to their respective electrodes by small micro-welding protuberances for allowing fusion of the contacts to the electrodes without excessive heating. Each contact includes a metal-coated plastic contact pad having a ribbon end for connection to an electrical load and a substantially flat part for connection to the electrode.

A high pressure fuel cell assembly includes a first pressure wall structure, a second pressure wall structure and a fuel cell stack sandwiched between the first and second pressure wall structures. The stack has at least one fuel cell. A high strength fiber is wrapped around the pressure wall structures. Interconnector fittings are positioned in the first and second pressure walls. The fittings have openings for receiving gas lines and water lines. A first high-strength foam end cap is positioned between the fuel cell stack and the first peripheral wall structure. A second high-strength foam end cap is located between the fuel cell stack and the second peripheral wall structure. Each end cap has a mating electrical coating that matches an electrical contact electrode of the fuel cell stack.

These and further and other objects and features of the invention are apparent in the disclosure, which includes the above and ongoing written specification, with the claims and the drawings.

DETAILED DESCRIPTION OF THE PREFERRED EMBODIMENTS

FIGS. 1–17 are cross-sectional views of the fuel cell components. To allow all fuel cell components to be easily shown and to accommodate the wide range of dimensions, the components have not been drawn to scale and are disproportionate to each other.

FIGS. 1–17 show the step-by-step development of the fuel cell 1. Generally, as shown in the drawings, a fuel cell 1 has a first, central fiber-reinforced membrane 3 having a hydrogen side 5 and an oxygen side 7. Electrodes 9, 11, shown in FIGS. 8–17, are positioned on the hydrogen side 5 and on the oxygen side 7 of the membrane 3. Each electrode 9, 11 has a first catalyst film layer 13 deposited on the central membrane 3. The catalyst film layer 13 is separated from the central membrane 3 by voids 15. Each electrode 9, 11 further includes a metal film layer 17 deposited over the catalyst film layer 13 and a hydrophobic film layer 19 positioned on the metal film layer 17. Electrolyte 21 is injected into the voids 15 between the catalyst film layers 13 and the central membrane 3. A first water circulating and regulating membrane 23 is positioned above the hydrogen side electrode 9. A fuel channel flow manifold 25 is positioned above the first water circulating and regulating membrane 23 and is sealed to the hydrogen side electrode 9. A fuel inlet 27 is connected to the fuel manifold 25 for delivering fuel to a region 29 between the fuel manifold 25 and the first water circulating and regulating membrane 23. A second water circulating and regulating membrane 31 is positioned below the oxygen side electrode 11. An oxygen gas manifold 33 is located below the second water circulating and regulating membrane 31 and is sealed to the oxygen side electrode 11. An oxidizer gas inlet 35 is connected to the oxygen gas manifold 33 for delivering oxidizer gas to a region 37 between the oxygen gas manifold 33 and the second water circulating and regulating membrane 31. A first electrical contact 39 is connected to the hydrogen electrode 9 and a second electrical contact 41 is connected to the oxygen electrode 11. A sealing rim 43 extends around and is connected to outer edges of the cell 1.

Figure 1:
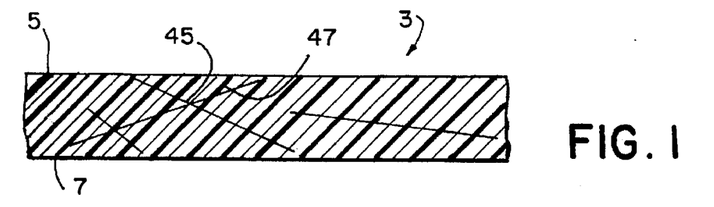
FIG. 1 is a cross-sectional view of a plastic-impregnated, fiber matrix membrane used in the new fuel cell.
Figure 13:
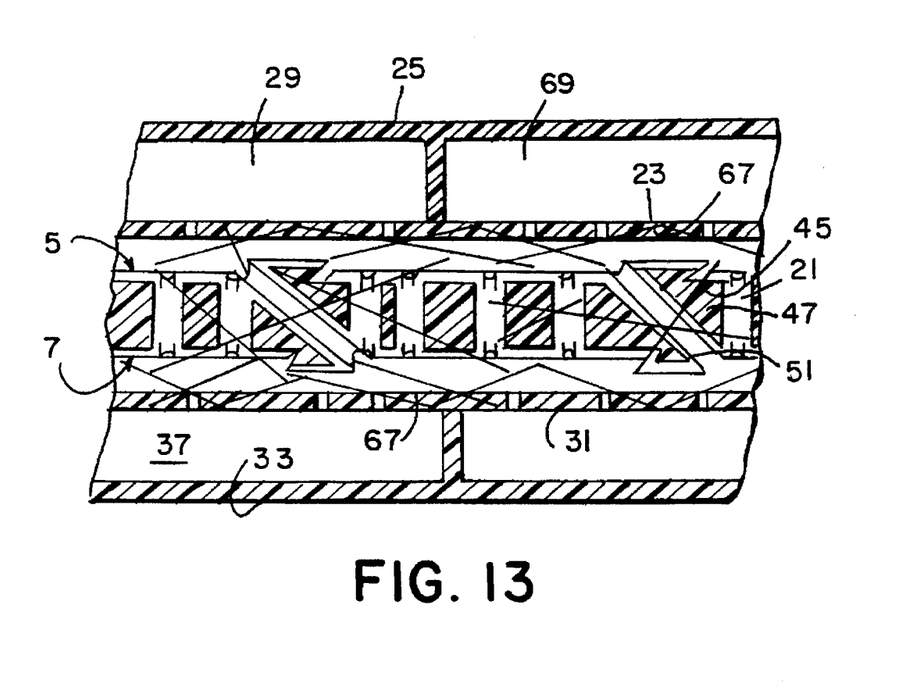
FIG. 13 is a cross-sectional view of the fuel cell stack assembly having gas flow manifolds.

Referring to FIG. 1, the central membrane 3 is preferably an electrically insulating matrix 45 of inert fibers impregnated with particle track sensitive plastic substrate 47. As shown in FIG. 13, the plastic substrate 47 can also have formed therein gas manifolds 25, 33 and seal surfaces 43. The insulating fiber matrix 45 can be a porous paper about ten microns thick that is held together independently of the plastic substrate 47. Other possible materials for the fiber matrix 45 include open cell foams and network matrix material such as expanded PTFE. In one embodiment, the track sensitive plastic substrate 47 impregnates or coats the matrix 45 with perfluorinated ion exchange polymer. In another embodiment, the track sensitive plastic substrate 47 impregnates or coats the matrix 45 with a removable solid such as aluminum. Electrically conductive matrixes are used only when single electrodes are to be formed.

Figure 2:
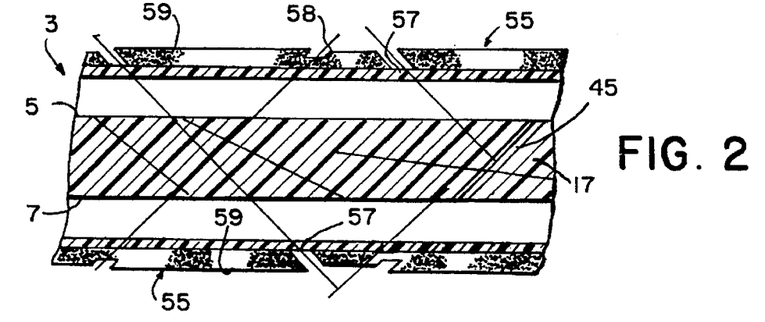
FIG. 2 is a cross-sectional view of the plastic-impregnated, fiber matrix membrane being irradiated through a pattern and thickness mask.

As shown in FIG. 2, the combination substrate 47 and matrix 45 of FIG. 1 is irradiated with charged particles. The particles may be fission fragments or alpha particles suitable for forming etch tracks in the plastic substrate 47. The etch tracks form the penetration channels 51 and overhang ledges 53 shown in FIG. 3. In one embodiment, the plastic substrate 47 is a perfluorinated ion exchange polymer electrolyte and the charged particles 54 that irradiate the substrate 47 are ions that decompose into pores directly under the bombardment. FIG. 2 shows multiple layer masks 55 positioned over the membrane for allowing precise bombardment of the membrane 3. By controlling the source angular direction of charged particles and the thickness of the mask 55 on the masked substrate, the pattern and depth of the particle tracks are controlled. The thicknesses of the masks 55 may be controlled by deposition of several mask layers. The thinnest portions 57 of the masks 55 are used to irradiate for the through channels. The second thinnest portions 58 of the masks 55 are used to irradiate for the overhang ledges 53 that will later be used to form the electrical breaks between cells. The thickest portions 59 of the masks 55 block irradiation from penetrating the masks 55 and from affecting the substrate 47 of the membrane 3. The inner thin layers are shadow masks.

Figure 3:
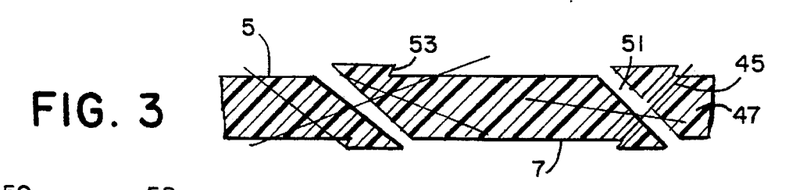
FIG. 3 is a cross-sectional view of the etched plastic-impregnated, fiber matrix membrane after the irradiation, revealing the through membrane slots and ledge overhangs.

As shown in FIG. 3, the masks are removed, and the irradiation tracks are etched to produce the penetration channels 51 and the overhang ledges 53.

Figure 4:
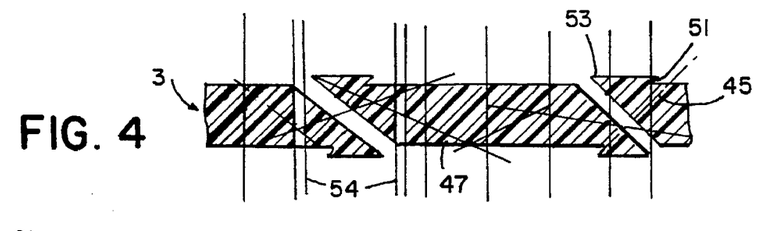
FIG. 4 is a cross-sectional view of an irradiated plastic-impregnated, fiber matrix membrane having a pattern of damage tracks for the cylindrical electrode pores.
Figure 5:
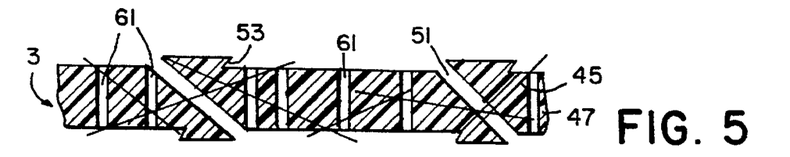
FIG. 5 is a cross-sectional view of the plastic-impregnated, fiber matrix membrane having the electrode pores etched out.

As shown in FIG. 4, the substrate 47 of the membrane 3 is irradiated a second time with charged particles 54 to form smaller electrode pores. FIG. 5 shows the smaller electrode pores 61 in the substrate 47 after etching. A series of irradiations and etches are used to form a population of larger gas channel pores and a denser population of smaller pores, if a large active surface area is needed in the electrodes. The angle and depth of the pores 61 are controlled to later permit good penetration of the metal conductor coatings without undercoating the ledge overhang 53.

Figure 11:
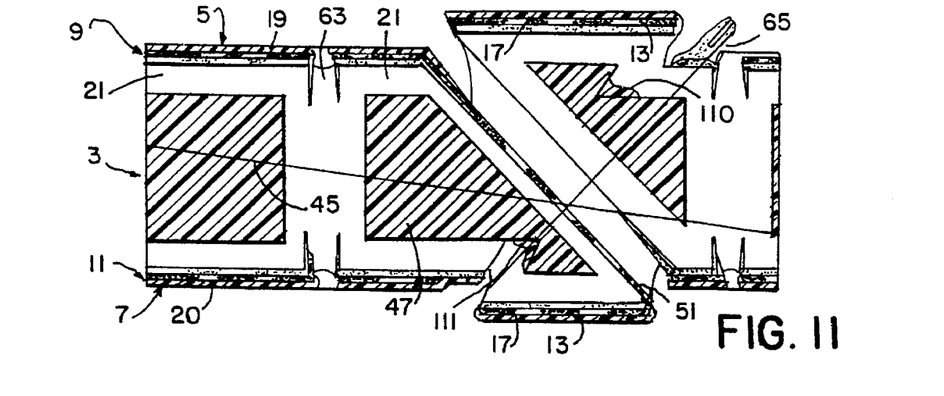
FIG. 11 is a cross-sectional view of the plastic-impregnated, fiber matrix membrane filled with an electrolyte.

As shown in FIG. 5, the small pores 61 are etched into the substrate 47 of the membrane 3. A solid polymer electrolyte 21 may be added to the etched particle track small pores 61 by a solution deposit after this step rather than later, as shown in FIG. 11. The membrane 3 is dried sufficiently for the following vacuum deposition steps.

Figure 6:
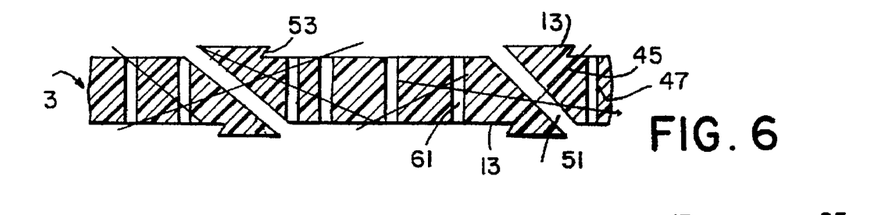
FIG. 6 is a cross-sectional view of the plastic-impregnated, fiber matrix membrane coated with catalyst film deposits for the fuel and oxidizer gases.
Figure 7:
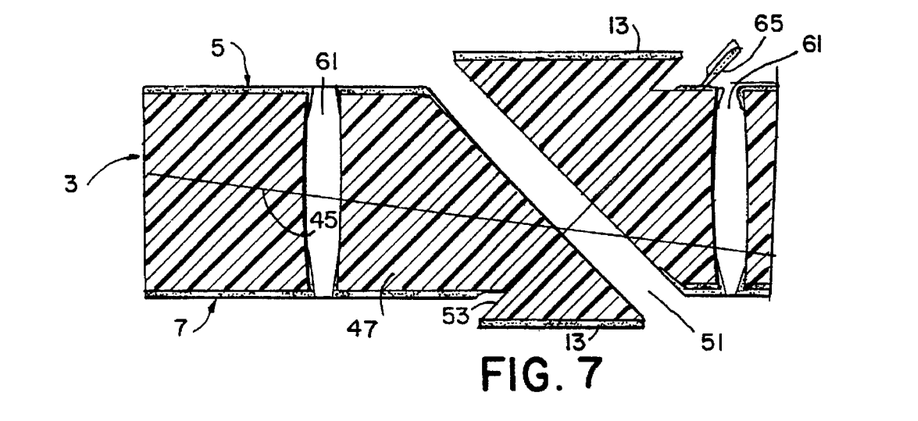
FIG. 7 is an enlarged view of the electrode of FIG. 6 showing details of the pores in the membrane.

FIGS. 6 and 7 shows the catalyst material coating 13 applied to the membrane 3. The coating 13 covers the exterior surfaces and partially covers the interior surfaces of the small pores 61 and the penetration channels 51. Methods for depositing the catalyst material coating 13 include vacuum deposition and ion milling. Typically, one nanometer thick films of platinum are deposited in the optimum locations in the pores 61. Deposition techniques make for very efficient use of the catalyst and keeps the overhang ledge 53 clean. A variety of catalysts and micro structures can be created in the catalyst film coating 13. Fluffy films are created in the coating 13 by either condensing the film at elevated vacuum pressures or through condensation at low temperatures. As shown in FIG. 7, the coating shadows the fiber matrix 45, and pores 65 are formed in the coating 13. In the drawings, the oxygen side 7 of the membrane 3 is shown at the bottom, and the hydrogen side 5 is positioned above of the membrane 3.

Figure 8:
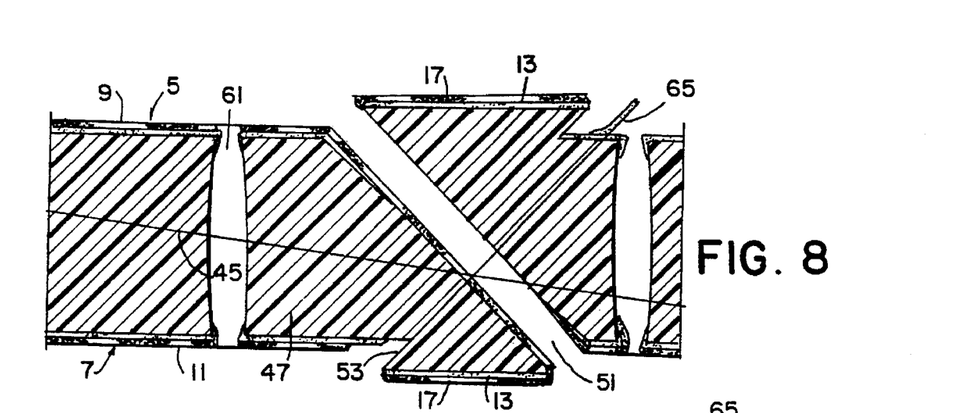
FIG. 8 is a cross-sectional view of the plastic-impregnated, fiber matrix membrane coated with metallic conductor film deposits.

FIG. 8 shows suitable bulk metal conductor films 17 deposited over the catalyst coatings 13 on the membrane 3. In one embodiment, the conductors are made of gold and have a thickness of about ten nanometers. The bulk metal conductor films 17 cover the surfaces of the penetration channels 51 and make electrical contact with the catalyst coatings 13. The films 17 do not cover the regions of the membrane 3 positioned in the shadow of the overhang ledges 53. The shadowing is accomplished using an angle controlled vacuum deposition source. Candidate materials for the bulk metal conductor films 17 include gold, platinum, palladium, ruthenium, graphite, boron doped diamond, refractory metals and electrically conducting refractory metal compounds. The thickness of the films 17 and the average electrical path length of the cell are optimized with a goal of minimizing the resistivity and maintaining a low metal-to-insulator ratio that ensures good fusing behavior if an electrical short occurs across the cell. Economically, the optimal electrical path length between cells, when using thin gold electrodes, is in the order of a centimeter.

The bulk metal conductor film 17 positioned on the hydrogen side 5 of the membrane 3 also serves as a catalyst and a semipermeable barrier to reactants. An example is in the direct methanol consumption fuel cell arrangement where methanol fuel is catalyzed to hydrogen and carbon dioxide on a platinum/ruthenium catalyst in a perfluorinated ion exchange polymer electrolyte. When the pores 61 and penetration channels 51 have palladium metal walls with a high aspect ratio (diameter/length ratio), much of the produced hydrogen can diffuse through the pore and channel walls to the catalyst coating 13, which is more efficient at utilizing the hydrogen. That arrangement limits the diffusion and loss of methanol through the fuel cell 1 and optimizes the use of expensive catalysts. In another embodiment, the thin bulk conductor film 17 is semipermeable and filters fuel gas to the primary catalyst coating 13 from a poison such as carbon monoxide or carbon dioxide in the fuel stream. The exact uniform pore geometry of the particle track pores 61 coupled with vacuum deposition of the films 17 and coatings 13 permits the diffusion properties of the ensemble of pores to be uniform and more amenable to optimization.

Figure 9:
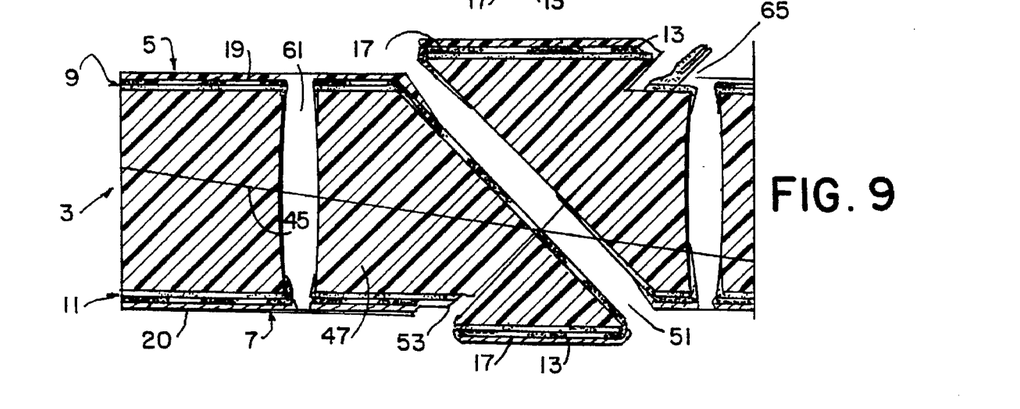
FIG. 9 is a cross-sectional view of the plastic-impregnated, fiber matrix membrane coated with plastic film deposits.
Figure 12:
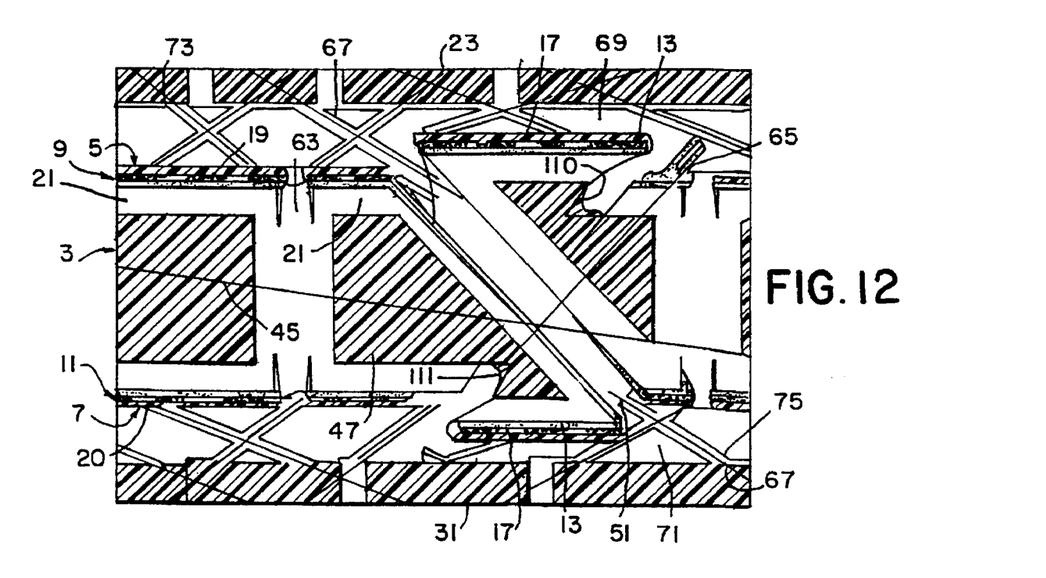
FIG. 12 is a cross-sectional view of the plastic-impregnated, fiber matrix membrane sandwiched between two porous condenser membranes, which form the fuel cell stack and water recirculation assembly.

As shown in FIG. 9, the bulk conductor films 17 are coated with hydrophobic films 19 and 20, such as a plasma polymerized PTFE (Teflon) film having a thickness of about 300 nanometers. Film 19 is deposited over the hydrogen side metal conductor film and film 20 is deposited over the oxygen side metal conductor film. Films 19, 20 form hydrophobic barriers on the electrodes 9, 11, thereby controlling the position of the meniscus, as shown in FIGS. 11 and 12, and also form a composite film with the bulk metal conductor 17. The films 19, 20 are on the hydrogen and oxygen sides. The film 19 deposited on the hydrogen electrode film 9 can be less hydrophobic than film 20 and can have a removable hydrophilic surface coating to allow electrolyte injection into the cell. The surfaces of the films 19, 20 can be modified to adjust the interfacial tension of water to produce a gradient of water contact angles, with the highest angle at the oxygen electrode 11 and the lowest angle at the hydrogen electrode 9. The plastic and metal composites form tough films that are resistant to fracture failure. The electrodes 9, 11 replicating the closed packed egg-crate like undulated etched particle track surfaces are geometrically two-dimensional films. That egg-crate like surface enhances the ability of the electrodes 9, 11 to flex and expand or contract with the electrolyte 21 and the fiber matrix 45.

Figure 10:
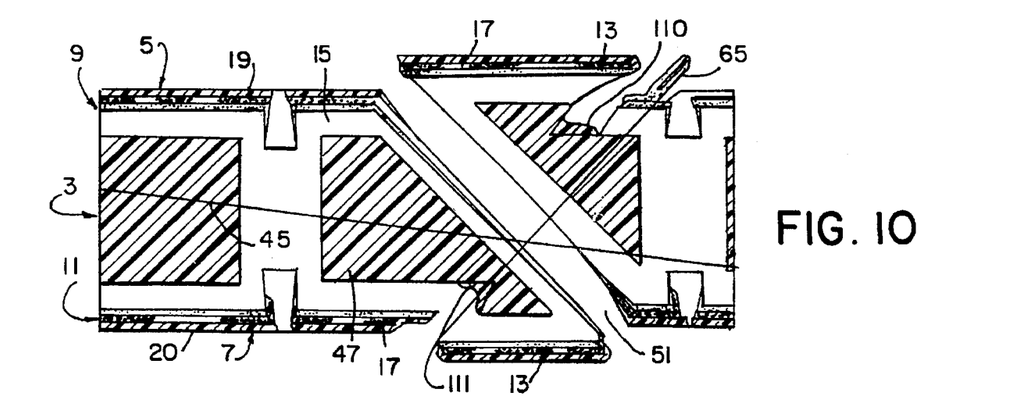
FIG. 10 is a cross-sectional view of the plastic-impregnated, fiber matrix membrane partially etched away to separate the surface coating from the substrate.

As shown in FIG. 10, the substrate 47 of the membrane 3 is etched to form voids 15 to obtain high internal surface areas of catalyst coatings 13 exposed to the electrolyte 21 when the electrolyte 21 is added, as shown in FIG. 11. The substrate 47 does not need to be entirely etched away. The partially etched substrate 47 helps substantially with membrane strength, enhances the conductivity of the solid polymer electrolyte 21, reduces the amount of electrolyte 21 used in the cell, reduces the electrolyte dimensional shrinkage during dehydration, blocks lateral current flow between adjacent cells, and improves diffusion blocking of the gas.

As shown in FIG. 11, an electrolyte 21, such as perfluorinated ion exchange polymer electrolyte, is flowed into the voids 15 between the electrode catalyst film 13 on the hydrogen electrode side 5. It is possible to later treat the hydrogen electrode 9, such as with a secondary catalyst, to give its pores 61 a hydrophobic entrance. An ion milling and PTFE deposit could be used after the etch or electrolyte deposit, such as with a solid polymer electrolyte, that could clean the hydrophobic surfaces 19, 20. The overhang ledge 53 can be cleaned by ion milling and a deposit of plasma polymerized film 110, 111 is deposited into the overhang ledge 53 to keep it clear of electrolyte and liquid water. That would define the gas electrolyte boundary after the electrolyte 21 is impregnated into the cell 1. If the fiber matrix 45 is expanded PTFE, the matrix 5 is chemically pretreated to be hydrophilic on the interior surfaces. The electrolyte 21 can also help fill in the penetration channels 51. The penetration channels 51 are electrically neutral, thereby allowing water to flow in a direction opposite the direction of cell flow for maintaining the cell water balance.

FIG. 12 shows the cell membrane 3 and electrodes 9, 11 assembled with heat-removing condensing surface membranes 23, 31. The water balance in the cell is essentially controlled by the temperature gradient from the electrode conductor films 17 to the condensing surfaces 23, 31. The thermal conduction through cell fiber matrix 45 and condenser fibers 67 to the condensing surface 31 typically determines the power density limits of the fuel cell 1. The gaps 69, 71 between the condensing surfaces 23 and 31, respectively, and electrodes 9, 11 need to be minimized to balance the water retention of the cell. If gaps 69, 71 are made small (10–50 microns), the cell operates close to the temperatures and humidities of the reactant gases in the manifolds 25, 33 shown in FIG. 13. If gaps 69, 71 are large, the cell operates at elevated temperatures above the reactant gases and performance is limited by the drying out of the electrolyte 21 and the diffusion rates of the reactants. The water balance of the cell's electrolyte 21 is maintained by collecting water from the oxidizer side 7 of the cell, wicking the water through the bulk metal coated penetration pores 51 and distributing the water back to the electrolyte 21 on the hydrogen or fuel side 5 of the cell 1. Moisture readily traverses the micron dimension gas gaps in the cell by evaporation and condensation from hydrated surfaces to dehydrated surfaces, when the surfaces are coated with a vapor pressure reducing electrolyte or surface coating 73, 75.

The water cycle in the cell is as follows: A) Water is driven across the cell electrolyte 21 to the oxygen side 7 of the cell; B) excess water vapor evaporates from the electrolyte 21 from the meniscus surface trapped by the hydrophobic film 19, the water evaporation carrying away with it waste heat from the fuel cell; C) some of the water vapor condenses on the condenser membrane surface 31 which is cooled by the flow of oxidizer gas going through the manifold 33, as shown in FIG. 13; D) condensed water moves across the surface of the condenser 31 and to the penetration pores 51; E) the liquid water flows or diffuses through the through pores 61 and 51, which have very little potential along them as compared to the cell electrolyte 21, thereby resulting in minimal ionic drag resistance for water when the pore is filled with electrolyte 21; F) water on the hydrogen side 5 of the cell exits the through pores 51 by flowing, diffusing or evaporating to the hydrogen side condensing surface 23; G) water moves across the condensing surface 23 by liquid flow or diffusion; and H) the water cycle is completed by water flowing along fibers or by evaporating and condensing to the dehydrated cell electrolyte 21. Excess water in the cell is removed from the outer surfaces of the oxygen and hydrogen condenser surfaces, 31 and 23, respectively, by evaporating into the oxidizer and fuel cell stream gases. The water vapor pressure and water retention is controlled by the vapor pressure of water on the condenser surface being hygroscopic when dehydrated and satisfied when hydrated. The condenser surface controls the water retention by being coated with an electrolyte or similar film. Excess water is removed to a variety of locations, depending on the expected use of the fuel cell and the probable environment of fuel cell use. If the cell is a sealed rechargeable cell, the condenser membranes 23, 31 can be the water reservoir for the cell. In air breathing cells, excess water is vented to the atmosphere. In a sealed pressurized cell, the fuel and oxidizer gas flows are channeled with the gas manifolds 25, 33 to multi-pass between the outer rim of the cell before the flows are consumed. The excess heat and excess water in the multi-pass flow is carried to the rim of the cell and repeatedly makes thermal exchanges with the surroundings through the pressure wall. The condensing surfaces 23, 31 can be an integral part of the fuel and oxidizer gas flow manifolds 25, 33, as shown in FIG. 13, or the cell stack membrane.

As shown in FIG. 13, the condensing surface membranes 23, 31 are reinforced with fibers 67. The fibers 67 are exposed by etching to ensure that condensing water can be wicked to the water outlet. The condensing surfaces 23, 31 lie on top of the electrode films. The flow channels 29, 37 deliver the reactants, remove products and enhance heat removal.

Figure 14:
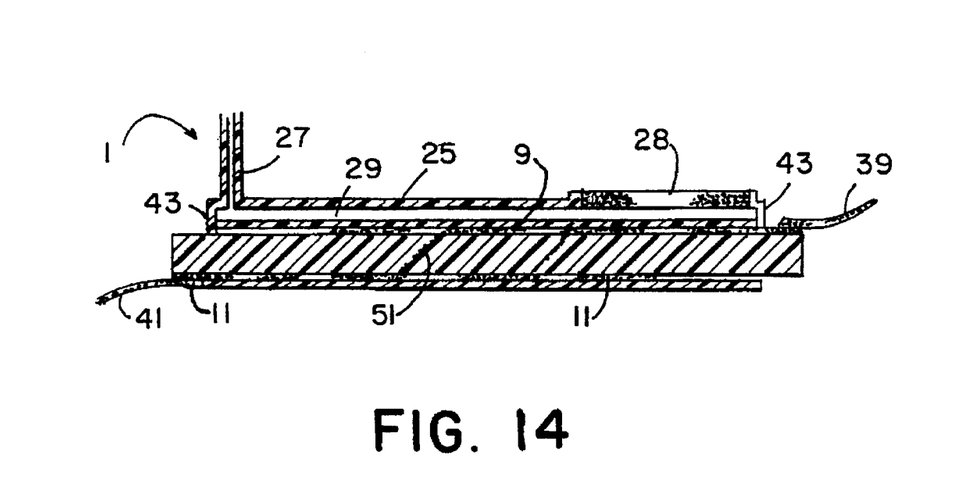
FIG. 14 is a cross-sectional view of the fuel stack cell assembly in an atmospheric oxidizer cell arrangement.
Figure 15:
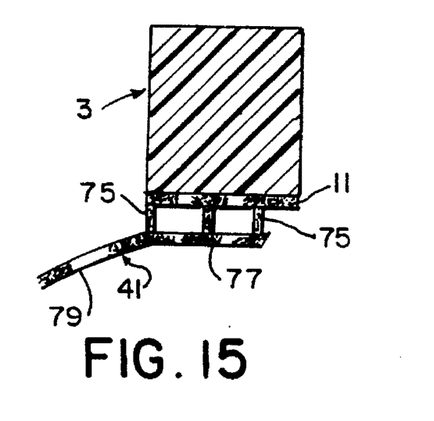
FIGS. 15 and 16 are enlarged views of the micro-welding contact pads of FIG. 14.
Figure 16:
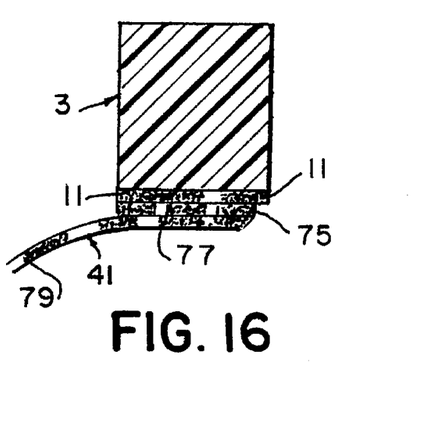

FIGS. 14–16 are cross-sectional schematic views of an assembled atmospheric fuel cell 1. The cell wall, the fuel gas manifold, the condenser surfaces and the cell stack are sealed to the outer rim of the cell stack. Preferably, the sealing is by welding or gluing. The fuel gas is added to the gas manifold 25 through an inlet tube 27. To remove inert gases or product gases from the fuel supply, the gases either diffuse through the fuel cell stack or through a semipermeable membrane 28 that is less permeable to the fuel gases. The cell stack electrode assemblies weave through penetration channels 51 in the cell membrane 3 to form a non-bipolar stack. The positive electrode output contact 39 and the negative electrode output contact 41 are positioned in a drier environment beyond the gas seal from the fuel. In preferred embodiments, the sealing surfaces are rubber-like materials such as silicon rubber or Teflon deposited either on the cell electrodes or on the rim. The cells 1 may be glued together or sealed with the original substrate plastic.

In one embodiment of the present invention as shown in FIGS. 15 and 16, electrical contacts 39, 41 between the cells and on the exterior surfaces of the cells have micro-welding contacts -small hair-like pedestals 75. To make contact to the external electrical loads from the thin film fuel cell electrodes 9, 11, micro-welding contact pads 77 are used to make the transition to conventional wires or bulk metal surfaces. FIG. 15 shows the micro-welding contacts 39, 41 before fusing; FIG. 16 shows the micro-welding contacts 39, 41 after fusing. Micro-welding fusing of the contacts 39, 41 allows distributed high temperature fusing contacts 39, 41 between thin film electrodes 9, 11 to be made without excessively heating the plastic substrate 47 and without delamination. The fusing of the contact pads 77 in the assembly of the fuel cell 1 is made by sending an electrical pulse through the pads 77 while they are pressed together. In preferred embodiments, the contact pad 77 is a metal coated plastic that transitions to plastic covered wires. Preferably, the contact pads 77 continue as a ribbon 79 to the electrical load.

Once the cell is assembled, a large current burst is run through the contacts 39, 41 to melt the hair-like pedestals 75 and thereby weld the contacts together.

Through careful bypass channel design and cell stacking, the reactant gases are used as cooling gases. The reactant gases flow past the cell condenser surfaces prior to being consumed. That allows for high heat transfer rates and movement of water vapor from the inner parts of the cells to the outer surfaces of the cells.

The outer rim seal 43, as shown in FIG. 14, serves several purposes, including sealing the electrodes from gas leaks, providing a heat exchange surface with the fuel cell's surroundings, condensing water and providing an electrical contact to the membranes.

Figure 17:
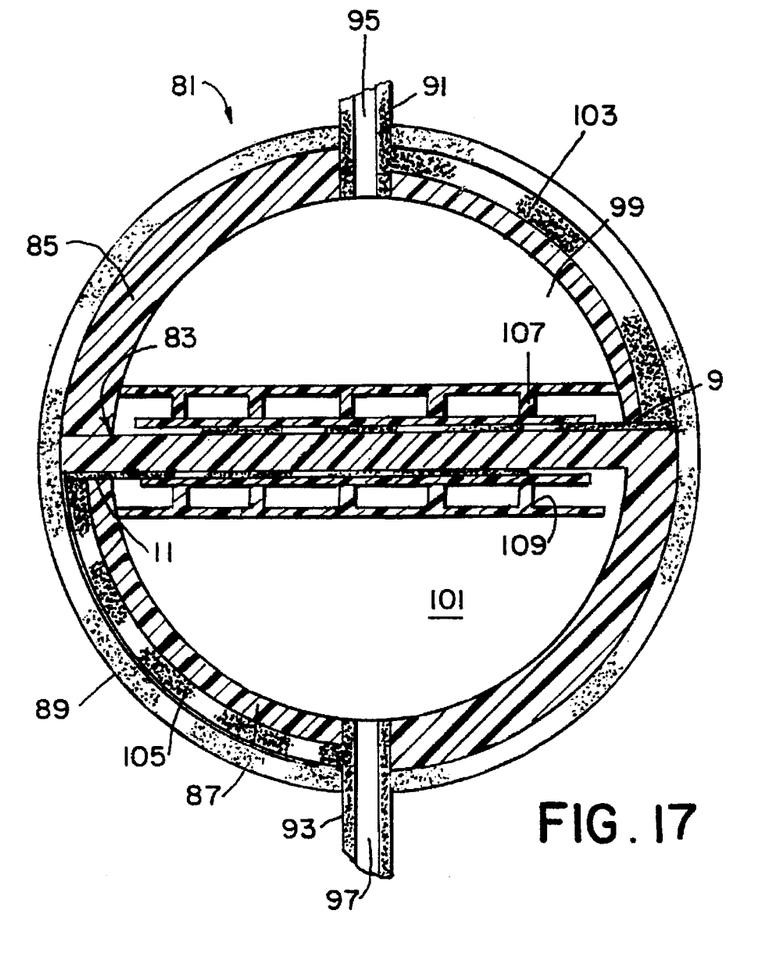
FIG. 17 is a cross-sectional view of the fuel cell stack assembly having a spherical pressure container to operate fuel cells on pressurized fuel and oxidizer gases.

A high pressure fuel cell assembly 81 is shown in FIG. 17. A fuel cell stack 83 is sandwiched between two pressure wall hemispheres 85, 87. The stack 83 is wrapped with a high strength fiber 89 to reinforce the pressure walls 85, 87 and to pull the pressure walls 85, 87 together. Removable interconnector fittings 91, 93 for the gas lines, the water lines, and the electrical connection points are located on the flat ends of the pressure wall hemispheres 85, 87. Fittings 91, 93 have inlet and outlet gas and water flow tubes passing through openings 95, 97 in the fittings 91, 93. The assembly structure 81 shown in FIG. 17 reduces system mass and decreases the risk of leakage by minimizing the number of cell wall penetrations. End caps 99, 101 are filled with a high-strength foam to avoid having large, open volumes of fuel and oxidizer and to planar support surfaces for the electrodes 9, 11. The end caps 99, 101 also serve as safe reactant reservoirs. The end caps 99, 101 have mating electrical coatings 103, 105 that match the electrical contact electrodes 9, 11 of the fuel cell stack 83. To enhance the cooling of the fuel cell stack 83, the flow channels through the gas manifolds 107, 109 make multiple passes through the center of the fuel cell stack 83 prior to consumption of the gas reactants.

While the invention has been described with reference to specific embodiments, modifications and variations of the invention may be constructed without departing from the scope of the invention, which is defined in the following claims.

I claim:

1. A fuel cell apparatus comprising a first, central fiber-reinforced membrane having an oxygen side and a hydrogen side, electrodes positioned on the hydrogen side and the oxygen side of the membrane, each electrode comprising a first catalyst film layer deposited on the central membrane, the catalyst film layers separated from the central membrane by voids, metal film layers deposited over the catalyst film layers, and hydrophobic film layers positioned on the metal film layers, electrolyte disposed in voids between the catalyst film layers through the central membrane, a first water circulating and regulating membrane positioned above the hydrogen side electrode, a fuel channel flow manifold positioned above the first water circulating and regulating membrane and sealed to the hydrogen side electrode, a fuel inlet connected to the fuel manifold for delivering fuel to a region between the fuel manifold and the first water circulating and regulating membrane, a second water circulating and regulating membrane positioned below the oxygen side electrode, an oxidizer gas manifold positioned below the second water circulating and regulating membrane and sealed to the oxygen side electrode, an oxidizer gas inlet connected to the oxidizer gas manifold for delivering oxidizer gas to a region between the oxidizer gas manifold and the second water circulating and regulating membrane, a first electrical contact connected to the hydrogen electrode and a second electrical contact connected to the oxygen electrode, and a sealing rim extending around and connected to outer edges of the cell.

2. The apparatus of claim 1, wherein the central membrane further comprises a fiber matrix impregnated with a plastic material, and further comprising pores and penetration channels extending through the membrane and overhang ledges on the hydrogen and oxygen sides of the membrane.

3. The apparatus of claim 2, wherein the fiber matrix is a dielectric fiber matrix made from a material selected from the group consisting of porous paper, open cell foams, expanded PTFE and network matrix material.

4. The apparatus of claim 2, wherein the plastic material is a perfluorinated ion exchange polymer.

5. The apparatus of claim 1, wherein the central membrane further comprises a fiber matrix impregnated with a removable solid.

6. The apparatus of claim 1, wherein the membrane has pores and penetration through channels extending through the membrane, wherein the electrodes are thin film electrodes, and wherein the catalyst film of each electrode substantially covers an entire exterior surface of the central membrane and partially covers inner surfaces of the pores and the penetration through channels.

7. The apparatus of claim 6, wherein the membrane further comprises overhang ledges on the hydrogen and oxygen sides of the membrane, and further comprising openings in the electrodes shaded by the overhang ledges.

8. The apparatus of claim 1, wherein the metal film layer is made of a bulk metal material selected from the group consisting of gold, platinum, palladium, ruthenium, graphite, boron doped diamond, refractory metals and electrically conducting refractory metal compounds.

9. The apparatus of claim 1, further comprising pores and penetration through channels extending through the membrane, and wherein each metal film layer is a bulk metal conductor film layer that covers inner surfaces of the penetration through channels and that makes electrical contact with the underlying catalyst film layer.

10. The apparatus of claim 1, wherein the electrodes are permeable to fuel and oxidizer gas.

11. The apparatus of claim 1, wherein the metal film layer on the hydrogen side of the membrane is selecting permeable and wherein the metal film layer on the oxygen side of the membrane is selectively permeable.

12. The apparatus of claim 1, wherein each of the hydrophobic film layers is made of PTFE and has a thickness of about 300 nanometers.

13. The apparatus of claim 1, wherein hydrophobic film positioned on the hydrogen side of the central membrane is less hydrophobic than the hydrophobic film positioned on the oxygen side of the central membrane.

14. The apparatus of claim 1, further comprising a hydrophilic surface coating applied to the hydrophobic film on the hydrogen side of the membrane for allowing electrolyte injection into the voids.

15. The apparatus of claim 1, further comprising a second catalyst film layer positioned over the hydrogen side electrode.

16. The apparatus of claim 1, wherein the hydrogen side electrode is separated from the first water circulating and regulating membrane by a first gap, wherein the oxygen side electrode is separated from the second water circulating and regulating membrane by a second gap, and wherein the first and second gaps are about 10–50 microns across.

17. The apparatus of claim 1, wherein the first water circulating and regulating membrane and the second water circulating and regulating membrane are reinforced with fibers.

18. The apparatus of claim 1, further comprising a permeable membrane position in the fuel manifold for passing carbon dioxide and other exhaust products and impurities.

19. The apparatus of claim 1, wherein the fuel manifold and the oxygen gas manifold are sealed by glue or by welding.

20. The apparatus of claim 1, wherein the first and second electrical contacts are connected to the respective electrode outside of the connection of the manifolds to the electrode.

21. The apparatus of claim 1, wherein the first and second electrical contacts are connected to their respective electrodes by micro-welding protuberances for allowing fusion of the contacts to the electrodes.

22. The apparatus of claim 1, wherein the first and second electrical contacts each include a metal-coated plastic contact pad having a ribbon end for connection to an electrical load and a substantially flat part for connection to the electrode.

23. A fuel cell assembly comprising a first pressure wall structure, a second pressure wall structure, a fuel cell stack sandwiched between the first and second pressure wall structures, the stack having at least one fuel cell, a fiber wrapped around the pressure wall structures, interconnector fittings positioned in the first and second pressure walls, the fittings having openings for receiving gas lines and water lines, a first foam end cap positioned between the fuel cell stack and the first peripheral wall structure, a second foam end cap positioned between the fuel cell stack and the second peripheral wall structure, and wherein each end cap having a mating electrical coating that matches an electrical contact electrode of the fuel cell stack.

24. The assembly of claim 23, wherein the at least one fuel cell of the fuel stack further comprises a first, central fiber-reinforced membrane having an oxygen side and a hydrogen side, electrodes positioned on the hydrogen side and the oxygen side of the membrane, each electrode further comprising a first catalyst film layer deposited on the central membrane, the catalyst film layer separated from the central membrane by voids, a metal film layer deposited over the catalyst film layer, and a hydrophobic film layer positioned on the metal film layer, electrolyte positioned in the voids between the catalyst film layers and the central membrane, a first water circulating and regulating membrane positioned above the hydrogen side electrode, a fuel channel flow manifold positioned above the first water circulating and regulating membrane and sealed to the hydrogen side electrode, a fuel inlet connected to the fuel manifold for delivering fuel to a region between the fuel manifold and the first water circulating and regulating membrane, a second water circulating and regulating membrane positioned below the oxygen side electrode, an oxidizer gas manifold positioned below the second water circulating and regulating membrane and sealed to the oxygen side electrode, an oxidizer gas inlet connected to the oxygen gas manifold for delivering oxidizer gas to a region between the oxidizer gas manifold and the second water circulating and regulating membrane, a first electrical contact connected to the hydrogen electrode and a second electrical contact connected to the oxygen electrode, and a sealing rim extending around and connected to outer edges of the cell.

25. A method for making a surface replica fuel cell comprising the steps of constructing a substrate by impregnating a fiber matrix with a plastic, forming etch tracks in the substrate, etching penetration channels and overhang ledges from the etch tracks in the substrate, forming electrolyte pores through the substrate, coating the substrate and parts of interiors of the electrolyte pores of the substrate with a catalyst material, depositing a conductor film on the catalyst and thereby depositing a first electrode on a top of the substrate and a second electrode on a bottom of the substrate, depositing hydrophobic films on the first and second electrodes, separating the catalyst material layer from the plastic of the substrate by etching the plastic from the substrate where the catalyst contacts the substrate, flowing electrolyte into the voids and into the penetration channels from the top side of the substrate, positioning an upper porous membrane over the first electrode, positioning a lower porous membrane below the second electrode, positioning a fuel gas manifold above the upper porous membrane, positioning an oxidizer gas manifold below the lower porous membrane, connecting a seal around outer edges of the substrate, manifolds, membranes and electrodes, sealing outer surfaces thereof and connecting contacts to the electrodes outside seal surfaces.

26. The method of claim 25, further comprising depositing a hydrophilic coating over outer surfaces of the electrodes, fibers, through-pores and top ledges after the step of depositing hydrophobic films.

27. The method of claim 25, wherein the step of forming electrode pores through the substrate further comprises irradiating the substrate with charged particles and etching pores formed by the irradiation.

28. The method of claim 27, further comprising repeating at least once the steps of irradiating the substrate and etching the pores.

29. The method of claim 25, wherein the step of forming etch tracks in the substrate further comprises the steps of masking the substrate with a mask having various thicknesses and bombarding the mask with charged particles, and wherein the bombarding step further comprises bombarding thinnest portions of the mask to create the through channels and bombarding middle thickness portions of the mask to create the overhang ledges.

30. The method of claim 25, wherein the step of flowing electrolyte into the voids and into the penetration channels is performed after the step of forming electrode pores through the substrate, but prior to the step of depositing a first electrode on a top of the substrate and a second electrode on a bottom of the substrate.

31. The method of claim 25, wherein the step of depositing a first electrode on a top of the substrate and a second electrode on a bottom of the substrate further comprises the step applying a bulk metal conductor film over the catalyst material coating.

32. The method of claim 31, wherein the step of coating an interior of the electrode pores of the substrate with a catalyst material further comprises not coating the overhang ledges, and wherein the step of applying a bulk metal conductor film over the catalyst material coating further comprises not coating the substrate in shadows of the overhang ledges.

33. The method of claim 25, wherein the step of depositing a first electrode on a top of the substrate and a second electrode on a bottom of the substrate is performed by a techniques selected from at least on of the techniques selected from the group consisting of vacuum deposition and ion milling.

34. The method of claim 25, further comprising removably positioning a hydrophilic coating over the first electrode for allowing electrolyte injection into the cell.

35. The method of claim 25, further comprising pretreating the fiber matrix prior to the step of impregnating the fiber matrix with plastic.

36. The method of claim 25, further comprising applying a surface coating of solid polymer electrolyte on condenser surfaces of the upper and lower porous membranes for increasing water capture affinity.

37. The method of claim 25, further comprising depositing a selective catalyst layer on inner surfaces of the smaller pores at the top of the substrate.

38. A fuel cell apparatus comprising a central membrane having an oxygen side and a hydrogen side, the membrane being a porous dielectric membrane with pores collimated through the membrane, a solid electrolyte coating on and through the central membrane, electrodes positioned on the hydrogen side and the oxygen side of the central membrane, each electrode further comprising a first catalyst film layer deposited on the electrolyte coating the central membrane, metal film layers deposited over the catalyst film layers, and hydrophobic film layers positioned on the metal film layers, a first water circulating and regulating membrane positioned above the hydrogen side electrode, a fuel channel flow manifold positioned above the first water circulating and regulating membrane and sealed to the hydrogen side electrode, a fuel inlet connected to the fuel manifold for delivering fuel to a region between the fuel manifold and the first water circulating and regulating membrane, a second water circulating and regulating membrane positioned below the oxygen side electrode, an oxidizer gas manifold positioned below the second water circulating and regulating membrane and sealed to the oxygen side electrode, an oxidizer gas inlet connected to the oxidizer gas manifold for delivering oxidizer gas to a region between the oxidizer gas manifold and the second water circulating and regulating membrane, a first electrical contact connected to the hydrogen electrode and a second electrical contact connected to the oxygen electrode, and a sealing rim extending around and connected to outer edges of the cell.

39. The apparatus of claim 38, further comprising cell portions produced by removal or exclusion of the solid electrolyte from a surface of the dielectric substrate and by removing or excluding deposits of the catalyst film layers and metal film layers.

40. The apparatus of claim 38, further comprising cell interconnections between adjacent cells made through the porous dielectric membrane or around edges of the porous dielectric membrane coated with the solid electrolyte by metal film deposits.

41. The apparatus of claim 38, wherein the solid electrolyte is of polymer material.

* * * * *